United States Patent [19]
Curran

[11] Patent Number: 5,158,230
[45] Date of Patent: Oct. 27, 1992

[54] AIR FLOW CONTROL APPARATUS

[76] Inventor: John R. Curran, 180 Ebenezer Rd., Osterville, Mass. 02655

[21] Appl. No.: 758,463

[22] Filed: Sep. 6, 1991

Related U.S. Application Data

[63] Continuation of Ser. No. 570,399, Aug. 21, 1990, abandoned.

[51] Int. Cl.⁵ .............................................. F24F 13/10
[52] U.S. Cl. ................................. 236/49.4; 137/486; 251/61.1
[58] Field of Search ...................... 236/49.4, 80 E, 84; 137/486, 488, 492; 251/61.1

[56] References Cited

U.S. PATENT DOCUMENTS

| | | | |
|---|---|---|---|
| 2,353,143 | 7/1944 | Bryant | 137/492 |
| 3,434,409 | 3/1969 | Fragnito | 236/49.4 X |
| 4,211,363 | 7/1980 | Osheroff | 236/49.4 |
| 4,262,738 | 4/1981 | Kato et al. | 236/84 X |
| 4,283,008 | 8/1981 | Ring | 236/49.4 |
| 4,356,963 | 11/1982 | Edwards et al. | 236/49.4 |
| 4,873,873 | 10/1989 | Day | 137/486 X |
| 5,000,214 | 3/1991 | Pelkey | 137/492 X |

Primary Examiner—William E. Tapolcai
Attorney, Agent, or Firm—Salter, Michaelson & Benson

[57] ABSTRACT

A flow control apparatus for controlling the flow of a low pressure air stream in an air duct of an air ventilation system includes a conduit section having spaced upstream and downstream ports in upstream and downstream portions thereof, a redirecting member in the conduit section for redirecting air in the upstream portion thereof so that it passes outwardly through the upstream port, and a loose flexible membrane operable for redirecting air passing outwardly through the upstream port so that it passes back inwardly through the downstream port. The apparatus further includes an outer housing defining an enclosed chamber around the outer side of the membrane and a controller for controlling the air pressure in the membrane in order to selectively collapse the membrane around the ports in the conduit section. The controller is operative for controlling the air pressure in the chamber by selectively connecting the upstream end of the conduit section to the chamber and selectively bleeding air off therefrom.

4 Claims, 6 Drawing Sheets

Section 1-1
FIGURE 3B

Section 2-2
FIGURE 3C

AIR FLOW CONTROL APPARATUS

This is a continuation of application Ser. No. 07/570,399 filed Aug. 21, 1990, now abandoned.

TECHNICAL FIELD

The subject invention generally relates to variable air volume (VAV) valves used in ventilation systems and, more particularly, to a system powered VAV valve responsive to feedback from a thermostat and/or a flow sensor, or the like.

BACKGROUND OF THE INVENTION

One way of controlling the temperature in individual comfort zones of multi-zone temperature conditioning systems, is to control the flow rate of heated (or cooled) air supplied to the zone. This is generally accomplished by controlling the position of a supply air valve in response to an air flow sensor and thermostat.

In a typical VAV system, computer controlled converters apply varying pneumatic pressure to VAV valve actuators causing the valve(s) to modulate air flow through distribution ducts, thereby controlling the temperature and degree of ventilation in the individual zones. In such a system there may be as many as 1000 VAV valves and a corresponding number of converters in the vast array of distribution ducts. Such a large pneumatic system requires the use of large air compressors to maintain the necessary system pressure. Such pneumatic systems are also very costly to install and maintain, and consume a great deal of power.

In an alternative approach, pneumatic thermostats are used to control the temperature in the comfort zones. A thermostat in each zone is typically supplied with air at a constant pressure from a remotely located compressor and pressure regulator, or from the system itself (i.e. system powered).

A typical pneumatic thermostat is disclosed in U.S Pat. No. 4,017,025. The noted patent utilizes two separate supplies of air pressure from a distribution duct to effect temperature responsive control of flow in a variable air volume system. A bellows is adapted to bias a bleed valve to close in response to temperature, and the resulting pressure increase in the control line associated with the bleed valve biases a second bleed valve to close, thereby effecting control of flow in the duct. The control is also operative to maintain a constant volume flow in the duct with respect to changes in duct pressure, by means of flow sensors biasing the bleed valve associated with the temperature responsive bellows.

The pneumatic thermostat disclosed in U.S. Pat. No. 4,283,008 includes means to regulate air flow through a distribution duct. The flow regulator is disclosed as a bellows diaphragm which is adapted to move a valve member in a linear direction relative to the duct. As the valve member is displaced, air flow through apertures in the apparatus housing is varied, thereby affecting flow rate. A drawback of most pneumatic thermostat systems is that they similarly require the use of large air compressors. Further, each system requires the installation of relatively long runs of pneumatic tubing at considerable expense.

The need therefore exists for VAV valves that are system powered and do not require auxiliary supplies of compressed air or long runs of pneumatic tubing for their actuation.

SUMMARY OF THE INVENTION

The disclosed air flow control apparatus substantially reduces or eliminates the disadvantages and shortcomings associated with the prior art techniques. The apparatus is system powered, temperature and air flow responsive, and especially adapted for use in a VAV system to effect control of temperature conditioned air flow in a distribution duct.

Generally, a conduit, having an upstream and downstream side, conveys high pressure air to a valve. The conduit is designed and configured such that the upstream side exhibits a fluid pressure in excess of the downstream side. The valve has at least one valve port in fluid communication with the upstream side of the conduit.

The valve element is oriented within the apparatus such that one side of the element is in fluid communication with the air flowing through the conduit and the opposite side of the element is in fluid communication with a pressure chamber. The pressure chamber is in fluid communication with a region of the higher pressure upstream side of the conduit which is at a higher pressure than the said one side of the valve element. The valve element is operative to control air flow through the conduit via the valve ports in response to fluid pressure on one side of the valve element being greater than the pressure on the opposite side.

Control of the valve element is achieved by selectively connecting the pressure chamber to the region of the upstream side of the conduit having a higher pressure than the one side of the valve element to displace the valve element to a closed position. The valve element is displaced to an open position by selectively bleeding air from the pressure chamber, causing the valve element to move in response to the greater fluid pressure exerted on the said one side of the valve element. The pressure gradient in the conduit is thus the source of fluid pressure which is employed to displace the valve element to the open and closed positions.

BRIEF DESCRIPTION OF THE DRAWINGS

Further features and advantages will become apparent from the following and more particular description of the preferred embodiment of the invention, as illustrated in the accompanying drawings, in which like reference characters generally refer to the same parts or elements throughout the views, and in which.

DETAILED DESCRIPTION OF THE INVENTION

In accordance with the present invention, the disclosed improved air flow control apparatus substantially reduces or eliminates the disadvantages and shortcomings associated with the prior art techniques. According to the invention, a conduit encased by a housing and defining a pressure or actuator chamber therebetween, and a valve member are generally provided to control air flow in a VAV system. A highly important technical advantage of the invention is that the air flow control apparatus is "system powered", i.e. uses the air flowing through the apparatus as the sole source of actuating power.

Figure 1:
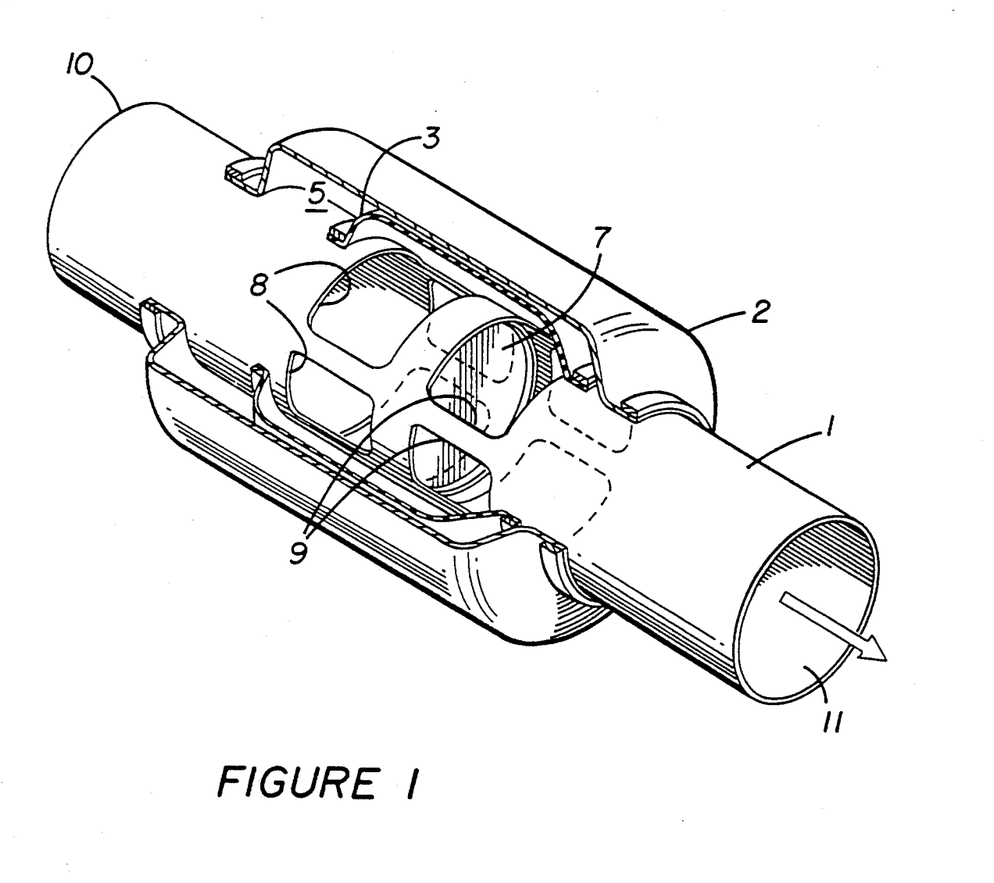
FIG. 1 is an isometric cut-away view of the air flow control apparatus according to the present invention.
Figure 2:
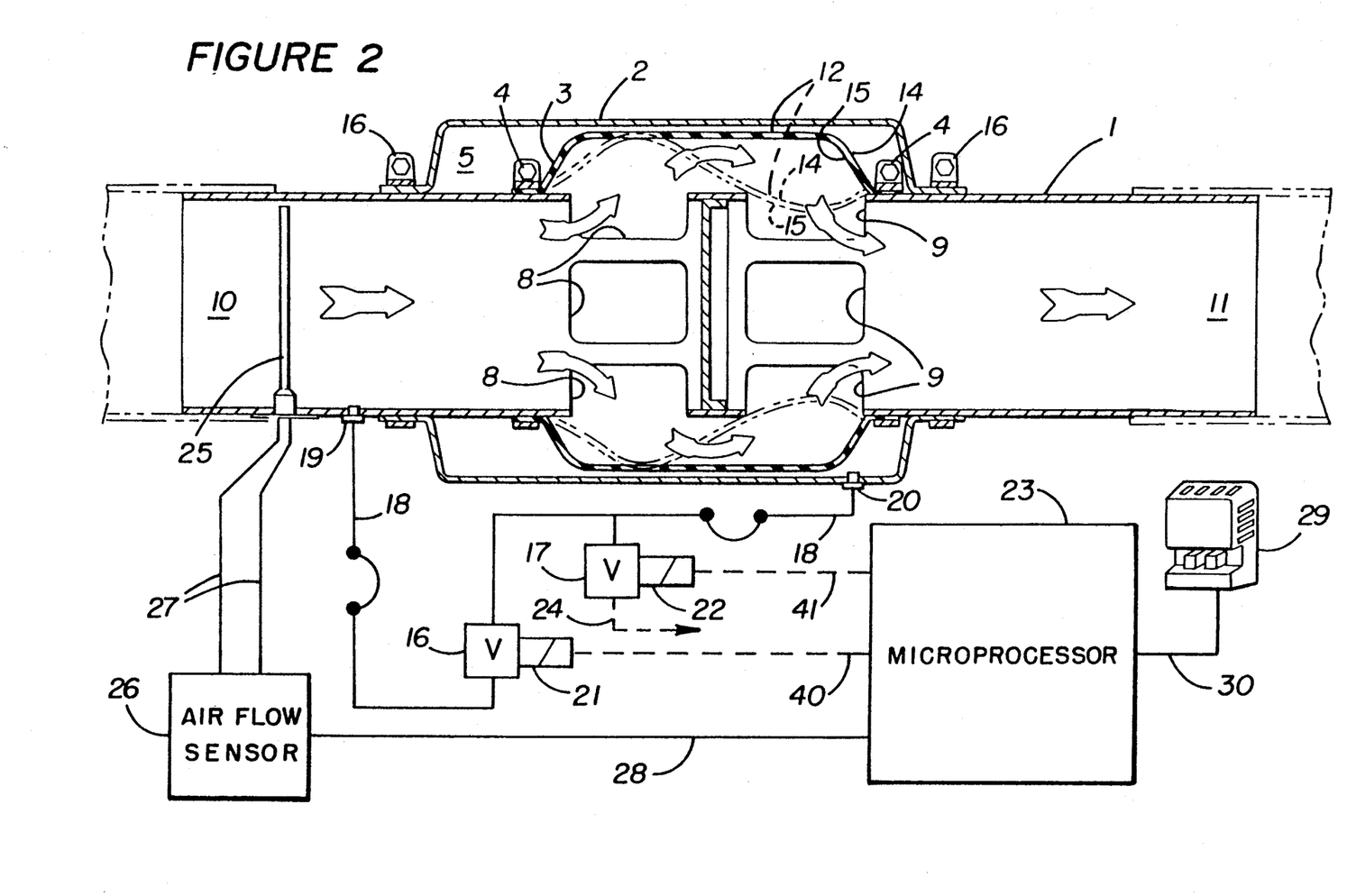
FIG. 2 is a schematic diagram of the air flow control apparatus according to the present invention.

FIG. 1 is an isometric cut-away view of the air flow control apparatus according to the present invention. The primary elements of the apparatus comprise a conduit 1, a housing 2, and a valve element 3. The housing is removably secured to the conduit 1 by virtue of a pair of conventional clamps 16 (FIG. 2). The housing 2 is oriented on the conduit 1 such that the housing 2 encases the conduit 1, forming a sealed actuator or pressure chamber 5 between the housing 2 and the valve element 3.

Figure 4:
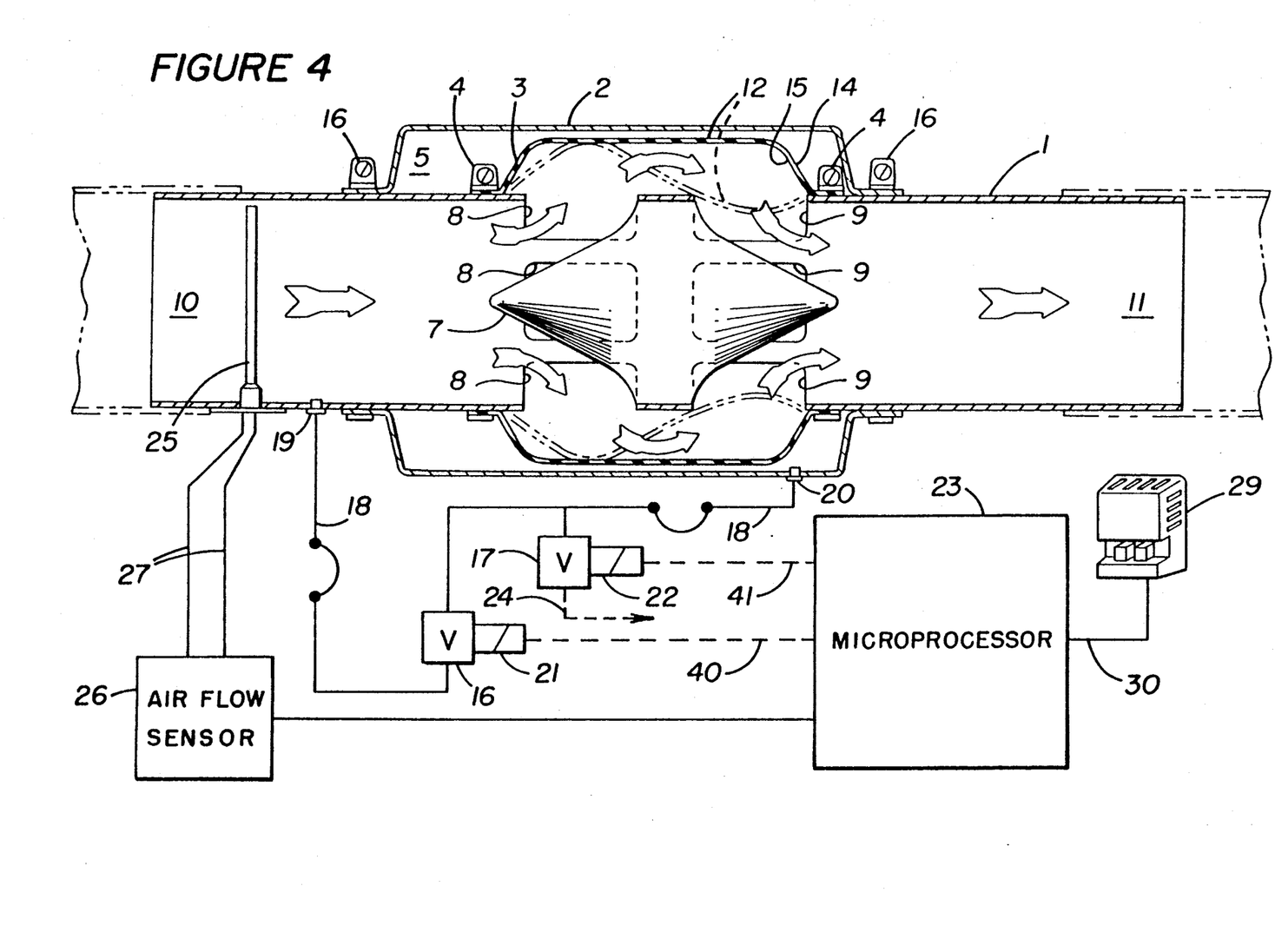
FIG. 4 is a schematic diagram of a second embodiment of the air flow control apparatus according to the invention.

In the preferred embodiment form of the invention, a flow dam 7 is also provided to re-direct air flow through valve ports 8 located on the upstream side 10 of the conduit 1. The flow dam 7 is designed and configured to achieve the desired air flow rate and pattern through valve ports 8 and 9. In the preferred embodiment form of the invention, the flow dam 7 has a substantially flat surface on the upstream 10 and downstream side 11. The flow dam 7 is disposed between the valve ports 8, 9 and positioned such that the cross-sectional area of the flow dam 7 is transverse to the axis of flow through the conduit 1. In another envisioned embodiment of the invention, the flow dam 7 may be conical shaped, as illustrated in FIG. 4. In this embodiment, the flow dam is positioned such that the axis of the flow dam 7 is substantially parallel to the axis of flow through the conduit 1.

When the valve element 3 is in the open position 12, as illustrated in FIG. 2, the re-directed air is conveyed through valve ports 9 located on the downstream side 11 of the conduit 1. In the preferred embodiment form of the invention, the air pressure on the upstream side 10 of the conduit 1 is generally maintained at constant pressure between 0.5 and 3.0 Inches Water Gage and the air pressure on the downstream side 11 is less than the pressure on the upstream side 10.

The upstream side 10 of the conduit 1 thus generally exhibits a fluid pressure in excess of the downstream side 11. This pressure gradient is achieved by selecting a conduit diameter 1, flow dam 7 configuration and position, and upstream and downstream valve port 8, 9 size and position in accordance with conventional engineering practice. This pressure gradient is the source of control air pressure which is used to move the valve element 3 to the open and closed positions 12.

As shown is FIG. 2, the valve element 3 is oriented in the apparatus such that the outer side 14 of the element 3 is in fluid communication with the pressure chamber 5. The pressure chamber 5 is in fluid communication with a region of the upstream side 10 of the conduit 1 which generally exhibits a pressure in excess of the pressure in the pressure chamber 5. The inner side 15 of the valve element 3 is in fluid communication with the upstream side 10 and the downstream side 11 of the conduit 1.

The valve element 3 may be fabricated out of a suitable pliable material such as plastic film or coated fabric. Each end of the valve element 3 is removably secured and sealed to the conduit 1 by virtue of a pair of conventional clamps 4. Easy access to the valve element 3 is thus assured to facilitate its replacement.

In the relaxed condition (open position 12), the outer diameter D3 of the valve element 3 generally satisfies the equation:

$$D_3 \text{ (VALVE ELEMENT 3)} = \sqrt{2 \times D_1^2} \text{ (CONDUIT 1)}$$

where: $D_1$ = the outer diameter of the conduit 1.

In order to displace the valve element 3 to the closed position 12 (dashed line), air from the higher pressure upstream side 10 of the conduit 1 is conveyed to the pressure chamber 5. As the higher pressure air enters the pressure chamber 5, an increasing pressure difference is produced across the valve element, in which the pressure on the outer side 14 of the valve element 3 is greater than the pressure on the inner side 15 of the valve element 3, thus causing the valve element 3 to collapse against the downstream side valve ports 9. In this closed position 12 (dashed line), the air flow through the conduit 1 will be essentially zero. As the valve element 3 is displaced toward the closed position, the pressure difference across the valve element increases as a result of the decreasing cross-sectional area of the downstream valve ports 9.

In order to displace the valve element 3 to the open position 12, the air within the pressure chamber 5 is bled off, thereby reducing the force exerted on the outer side 14 of the valve element 3. The higher pressure, and resultant force, exerted on the inner side 15 of the valve element 3 by the air on the upstream side 10 will thus cause the valve element 3 to move away from the downstream side valve ports 9, i.e. open position 12, allowing the air flow through the conduit 1 to increase to 100% capacity.

If the value element 3 was fabricated out of an elastic material and was adapted to fit tightly onto the conduit 1 and expand (like a balloon) to modulate air flow through the conduit 1, the value element 3 would have to be extremely thin in order to be displaced (i.e. stretched) by the relatively low upstream side 10 air pressure. The valve element 3 would thus be very fragile and lack the desired durability. Hence, the valve element 3 is normally constructed so that it does not have to be resiliently or elastically deformed as it is moved between the open and closed positions thereof.

Figure 3A:
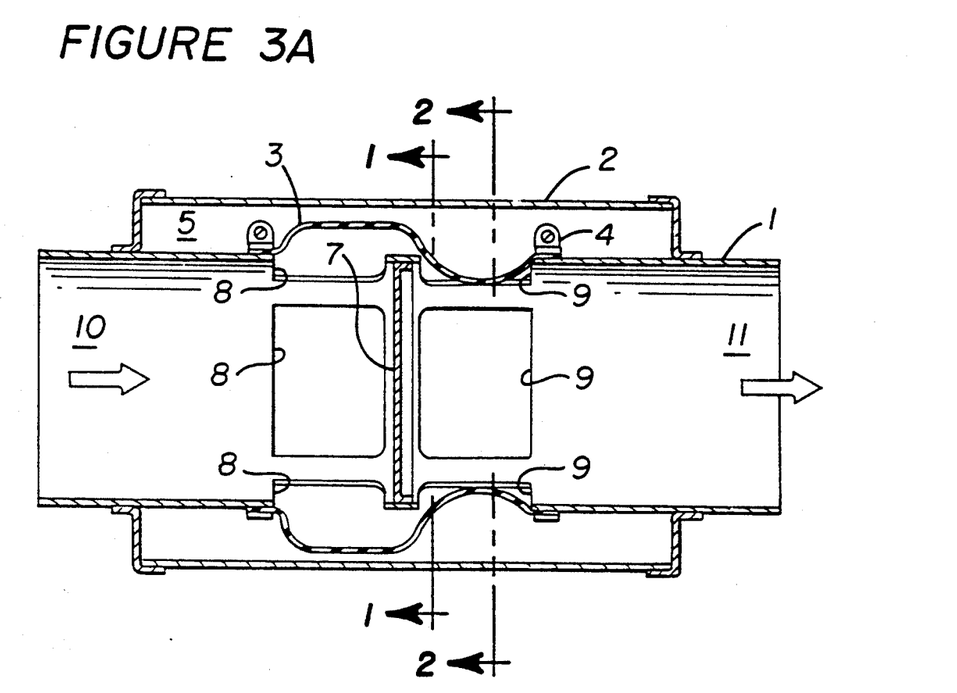
FIG. 3A is a full section view of the air flow control apparatus according to the present invention.
Figure 3B:
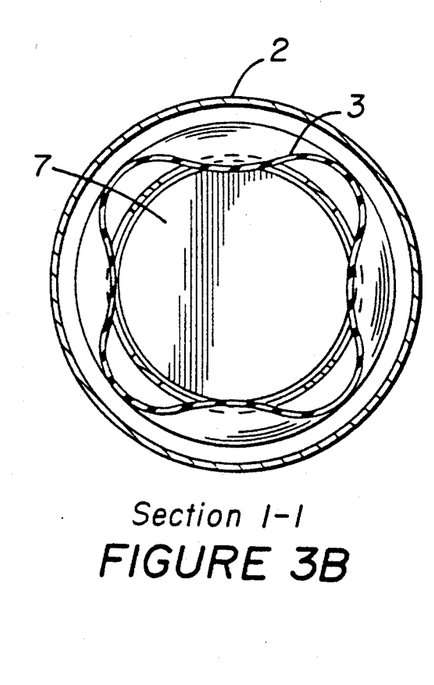
FIG. 3B and 3C are sectional views of the air flow control apparatus along lines 1—1 and 2—2, respectively, of FIG. 3A.
Figure 3C:
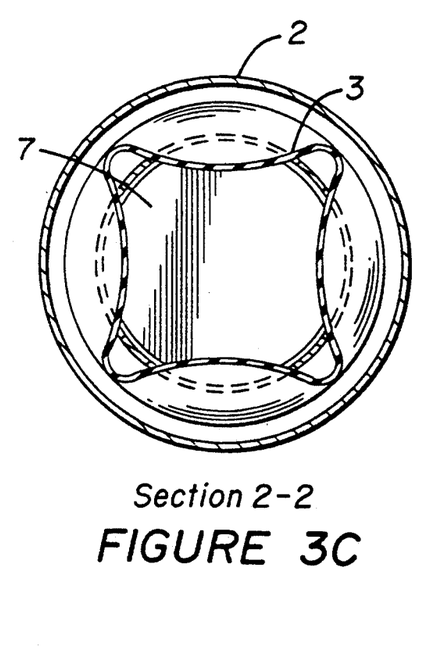

As the flexible valve element 3 is displaced toward the closed position 12 (dashed line), the volume of air in the pressure chamber increases proportionately. Thus, if the air flow to and from the pressure chamber 5 is cut off while the valve element 3 is being displaced toward the closed position 12 (dashed line), the pressure chamber 5 volume will adjust accordingly to decrease the effective pressure in the pressure chamber 5, if necessary, until the pressure exerted on the outer side 14 of the valve element 3 is essentially equal to the pressure exerted on the inner side 15 of the valve element 3. This equilibrium state or intermediate "throttling" position, as illustrated in FIGS. 3A-C, may also be achieved while the valve element 3 is being displaced toward the open position 12.

Thus, any position of the valve element 3 may be selected between full open and closed positions 12 by controlling the amount of air transferred to and from the pressure chamber 5. Since the pressure chamber 5 is effectively sealed, when said air flow is cut off and the valve element 3 has reached the aforementioned equilibrium state the valve element 3 will maintain the predetermined throttling position. This allows the valve element 3 to be controlled in a fully proportional manner.

In the preferred embodiment form of the invention, ports 8 and 9 are essentially the same size and configuration. The cross-sectional area of ports 8 and 9 are essentially equal, and the cross-sectional area of port 8 is essentially equal to the cross-sectional area of the conduit 1. This dimensional relationship provides adequate un-supported area under the valve element 3 to virtually eliminate any air flow through the conduit 1 when the element 3 is in the closed position. This also requires a large displacement of valve element 3 to effectuate full open and closed positions 12 thereof. Consequently, the variations in controlled air pressure in the pressure chamber 5 will be relatively large which is conducive to accurate and fully proportional control of the valve element 3.

Any number, size and shape of ports 8, 9 may be functionally employed in the invention. However, to achieve a uniform fluid flow distribution through the conduit 1, four inlet ports 8 and four outlet ports 9 are optimum.

In order to control the air pressure in the pressure chamber 5, a conventional electro-pneumatic fill valve 16 and a bleed valve 17 are provided. Valves 16 and 17 are operatively connected in parallel to a flexible feed line 18 which is in fluid communication with the upstream side 10 of the conduit 1 and the pressure chamber 5. The feed line 18 is suitably connected in fluid communication with the upstream side 10 of the conduit 1 by virtue of nozzle 19. The feed line is also suitably connected to the housing 2 by virtue of nozzle 20 which is in fluid communication with the pressure chamber 5.

The fill valve 16 and the bleed valve 17 are provided with electric solenoids 21 and 22 to actuate the valves 16 and 17. The solenoids 21 and 22 are responsive to a control signal produced by a remote microprocessor 23. The control signal is conveyed to solenoids 21 and 22 by lines 40 and 41, respectively. To reduce air flow through the apparatus, the fill valve 16 is opened and the bleed valve 17 is closed. Pressurized air from the upstream side 10 of the conduit 1 is thus conveyed to the pressure chamber 5, displacing the valve element 3 to the closed position 12 (dashed line).

To increase air flow through the apparatus, the fill valve 16 is closed and the bleed valve 17 is opened. Air within the pressure chamber 5 is thereby released and conveyed to the atmosphere through exhaust line 24, allowing the valve element 3 to move to the open position 12 by virtue of the force exerted by the upstream side 10 air on the inner side 15 of the valve element 3.

Although changes in air flow through the apparatus may be calculated based on the accumulated open times of valves 16 and 17 and operated in an open loop (floating control mode), the preferred method of control involves the direct measurement of air velocity through the conduit 1. In the preferred embodiment form of the invention, a conventional air flow sensor 26 is provided. A multi-port pitot tube 25 is also provided which is operatively connected to the upstream side 10 of the conduit 1. The pitot tube 25 provides a differential pressure signal which is is conveyed to the air flow sensor 26 via input lines 27. The pitot tube 25 is oriented within the upstream side 10 of the conduit 1 such that the tube 25 is transverse to the axis of flow through the conduit 1.

The air flow sensor 26 produces a first input signal in response to the differential pressure signal provided by the pitot tube 25, representative of the inlet air velocity. The air flow sensor 26 is in communication with and conveys the first input signal to the microprocessor 23 by virtue of line 28.

As should be apparent to one skilled in the art, air flow may also be measured by means of an orifice plate, flow nozzle, venturi tube, or any of a variety of heated films or thermistor flow sensitive devices.

The more common applications of the improved air flow control apparatus involve the variable air volume (VAV) requirements for temperature control of building spaces. Other air flow control applications involve room static pressure control associated with "clean rooms" or other "velocity mode" control requirements. To accommodate these varying applications, the microprocessor 23 is adapted to operate on either the "automatic temperature control mode" or the "velocity mode".

In the automatic temperature control mode, the room (space) temperature is measured by a solid state precision temperature sensor 29 which provides a second input signal for the microprocessor 23. The input signal is conveyed to the microprocessor 23 by virtue of input line 30. The microprocessor 23 compares this input signal against a pre-determined temperature set point. Through the use of a PID control algorithm, the microprocessor 23 calculates a new air velocity set point as required, adjusting for any error between the measured temperature and the temperature set point. Thereafter, the microprocessor 23 provides a control signal to either valve 16 or valve 17, as required, to effect a change in air velocity passing through the conduit 1.

Once the air velocity through the conduit 1 reaches the new velocity set point, both valves 16 and 17 will be closed until either the velocity drifts off of set point or a new set point is established. Minimum and maximum air flow limits are also stored in the microprocessor 23 memory. The air flow limits may simply be static settings or may be dynamically changed in response to system-wide requirements.

In the velocity control mode, the current velocity set point is calculated or set based on non-temperature related criteria. The valve element 3 is accordingly modulated as required to maintain the velocity through the conduit 1 at the current set point.

Figure 5:
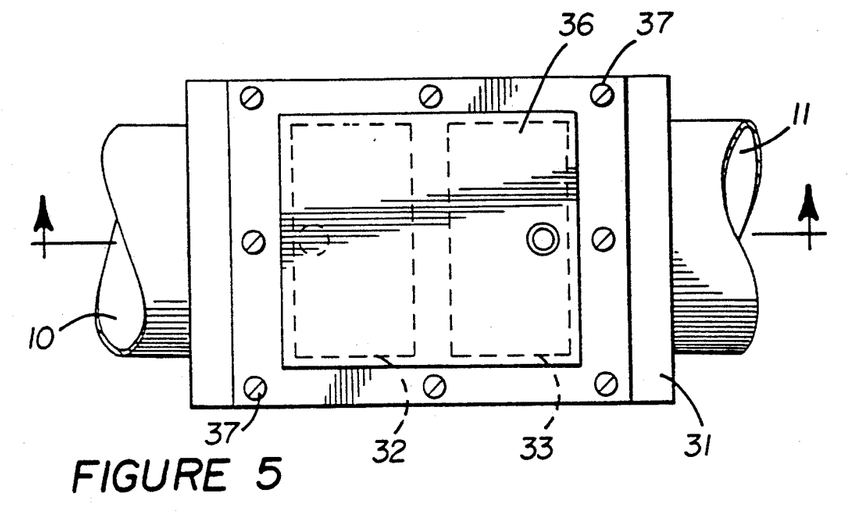
FIG. 5 is a plan view of a third embodiment of the air flow control apparatus according to the invention.
Figure 6:
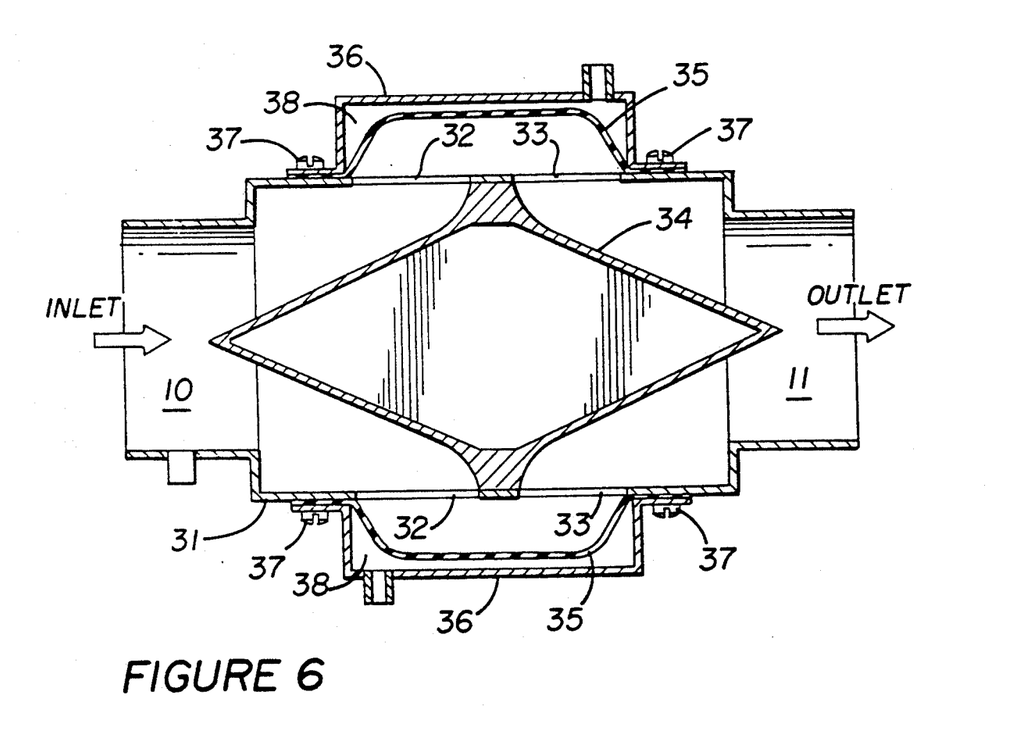
FIG. 6 is a full section view of the third embodiment of the air flow control apparatus according to the invention.
Figure 7:
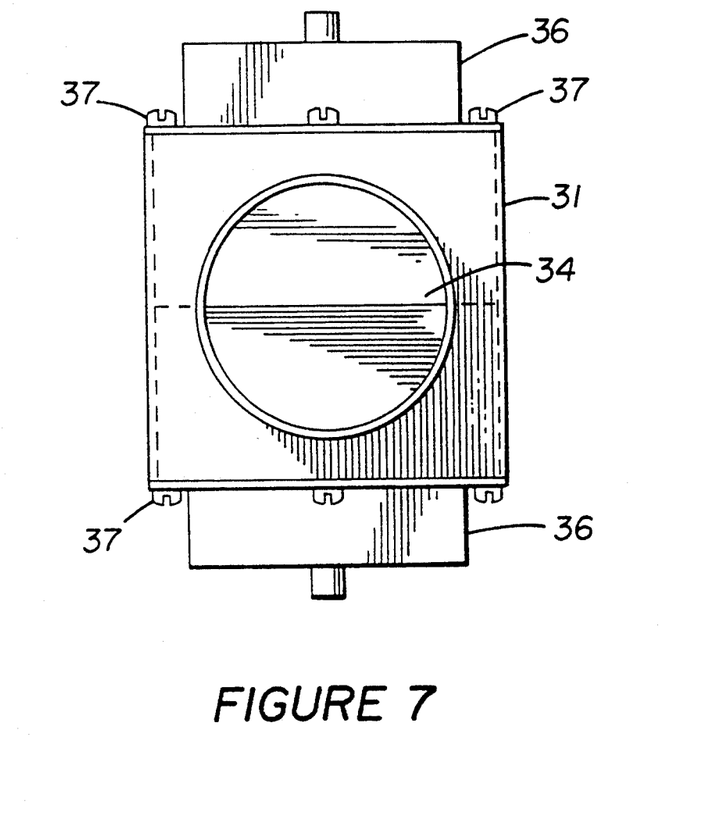
FIG. 7 is an end elevational view of the third embodiment of the air flow control apparatus according to the invention.

Referring now to FIGS. 5-7, there is illustrated another embodiment of the invention. This embodiment is primarily distinguishable by a conduit 31 having a substantially rectangular cross-section.

In this embodiment a pair of upstream side 10 and downstream side 11 valve ports 32 and 33, respectively, are disposed on opposite sides of the conduit 31. A double wedge shaped flow dam 34 is also provided to re-direct air flow through the apparatus. The flow dam 34 is oriented within the apparatus such that the apex on each side of the double wedge shaped flow dam 34 is disposed on the upstream 10 and downstream 11 side, respectively, and the angled sides of each wedge are on the same plain as the valve ports 32 and 33.

A pair of pliable hat shaped valve elements 35 are operatively secured to the conduit 31 by a pair of conduit covers 36; each cover 36 being secured to the housing 36 by eight (8) conventional machine screws 37. The valve elements 35 and conduit covers 36 are thus sealed at their common junction, forming pressure chambers 38 therein. The valve elements 35 provide the same functions and are controlled in the same manner as the aforementioned preferred embodiment.

While the embodiments of the apparatus have been disclosed with reference to specific structures, one of ordinary skill in the art can make various changes and modifications to the invention to adapt it to various uses and condition. As such, these changes and modifications are properly, equitably, and intended to be, within the full range of equivalence of the following claims.

What is claimed is:

1. A flow control apparatus for controlling the flow of a low pressure air stream in an air duct of an air ventilation system comprising:
    a. conduit means including an upstream conduit section for receiving said airstream therein at an upstream pressure level and a downstream conduit section for discharging said airstream outwardly therefrom at a lower downstream pressure level, said upstream conduit section having at least one upstream port therein for passing air outwardly therethrough, said downstream conduit section having at least one downstream port therein for receiving air inwardly therethrough;
    b. valve means operable in open and closed positions and including a loose flexible membrane on said conduit means, said membrane being operable in an open position for directing air passing outwardly through said at least one upstream port so that it thereafter passes inwardly through said at least one downstream port, said membrane being operable in an at least partially inwardly collapsed closed position for obstructing the passage of air from said at least one upstream port through said at least one downstream port, said membrane being constructed so that it is movable between the open and closed positions thereof without being elastically deformed, and being configured to be normally retained in the open position thereof by the pressure of the air passing from said at least one upstream port to said at least one downstream port, said membrane being spaced outwardly from said at least one upstream port and said at least one downstream port by a sufficient amount to permit air to flow substantially unrestricted from said at least one upstream port to said at least one downstream port when said membrane is in the open position thereof;
    c. pressure reducing means for reducing the pressure of air passing from said upstream conduit section to said downstream conduit section from said upstream level to said downstream level, said pressure reducing means including said at least one upstream port, said at least one downstream port and redirecting means redirecting air passing through said upstream conduit section so that it passes outwardly through said at least one upstream port;
    d. chamber means defining an enclosed chamber around the outer side of said membrane; and
    e. control means selectively connecting said pressure chamber to said upstream conduit section for receiving air therefrom in said pressure chamber at said upstream pressure level in order to move said membrane to the closed position thereof and selectively bleeding air off from said pressure chamber to move said membrane to the open position thereof.

2. In the flow control apparatus of claim 1, said chamber means being spaced outwardly from said membrane when said membrane is in either of the open or closed positions thereof.

3. In the apparatus of claim 1, said redirecting means comprising a flow dam having a substantially flat upstream surface facing in an upstream direction in said upstream conduit section in substantially transverse relation therein, and a substantially flat downstream surface facing in a downstream direction in said downstream conduit section in substantially transverse relation therein.

4. In the apparatus of claim 1, said flow restriction means comprising a flow dam having wedge shaped upstream and downstream ends which face in upstream and downstream directions, respectively, in said upstream and downstream conduit sections, respectively.

* * * * *